A. E. NORRIS.
CONVEYING STRUCTURE.
APPLICATION FILED MAY 3, 1916.

1,299,010.

Patented Apr. 1, 1919.
8 SHEETS—SHEET 1.

Inventor
Almon E. Norris

A. E. NORRIS.
CONVEYING STRUCTURE.
APPLICATION FILED MAY 3, 1916.

1,299,010.

Patented Apr. 1, 1919.
8 SHEETS—SHEET 3.

Inventor:
Almon E. Norris

A. E. NORRIS.
CONVEYING STRUCTURE.
APPLICATION FILED MAY 3, 1916.

1,299,010.

Patented Apr. 1, 1919.
8 SHEETS—SHEET 4.

Inventor:
Almon E. Norris
Att'ys

A. E. NORRIS.
CONVEYING STRUCTURE.
APPLICATION FILED MAY 3, 1916.

1,299,010.

Patented Apr. 1, 1919.
8 SHEETS—SHEET 6.

Inventor:
Almon E. Norris
Attys

A. E. NORRIS.
CONVEYING STRUCTURE.
APPLICATION FILED MAY 3, 1916.

1,299,010.

Patented Apr. 1, 1919.
8 SHEETS—SHEET 7.

Inventor:
Almon E. Norris
by [signature]
Attys.

UNITED STATES PATENT OFFICE.

ALMON E. NORRIS, OF CAMBRIDGE, MASSACHUSETTS.

CONVEYING STRUCTURE.

1,299,010.      Specification of Letters Patent.      Patented Apr. 1, 1919.

Application filed May 3, 1916. Serial No. 95,241.

*To all whom it may concern:*

Be it known that I, ALMON E. NORRIS, a citizen of the United States, and a resident of Cambridge, county of Middlesex, State of Massachusetts, (whose post-office address is 31 Main street, Cambridgeport, Massachusetts,) have invented an Improvement in Conveying Structures, of which the following description, in connection with the accompanying drawings, is a specification, like characters on the drawings representing like parts.

This invention relates to conveying structures which are adapted to travel along rails and transport hoisting or other apparatus mounted thereon to different points.

Among other objects the invention provides strong and effective means for holding the structure securely to the rails and means for controlling the application of the holding means to and the release of the same from the rails. The invention is an improvement upon the construction shown in my copending application Serial No. 872,029 filed November 13, 1914.

The character of the invention may be best understood by reference to the following description of an illustrative embodiment thereof shown in the accompanying drawings, wherein:—

Fig. 17 is a vertical section taken on line 17—17 of Fig. 13;

Referring to the drawings, the illustrative apparatus shown therein as embodying the invention comprises a conveying bridge structure 1 (Figs. 1, 2 and 3) mounted on trucks 3 having wheels 5 on shafts journaled in bearings therein. As shown herein each truck is provided with four wheels and each truck is provided with a motor 7 for driving said wheels, the motors being controlled as more fully hereinafter described.

Figure 23:
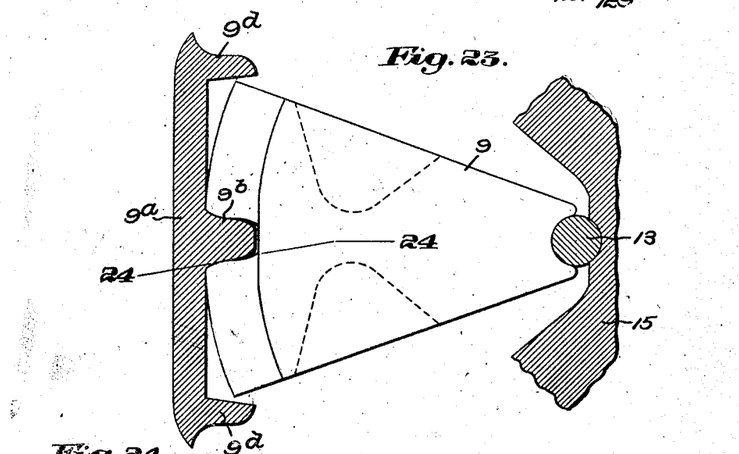
Fig. 23 is a view partly in horizontal section and partly in plan showing the clamp cam and its shoe.
Figure 24:
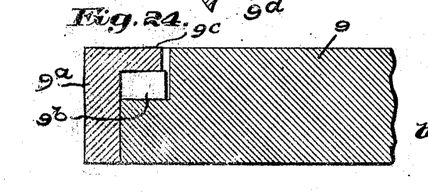
Fig. 24 is a vertical section taken on line 24—24 of Fig. 23.

Each truck may be equipped with means for clamping the same to the rail along which it travels. Since all of the clamps are similar in construction, a description of one will suffice for all. The illustrative clamp shown herein as embodying the invention comprises opposed jaws adapted to grip the rail between them. These jaws embody certain features of the jaws described in my said co-pending application. The inner jaw is in the form of a cam 9 (Figs. 5, 6 and 23) having a vertical end groove fulcrumed on a pin 13 mounted in a segmental shaped housing 15.

The cam may be provided with a shoe $9^a$, having a flat surface to engage the rail. A tooth $9^b$ on the shoe is adapted to enter a recess in the outer end of the cam to cause the shoe to move along the rail with said cam. A flange $9^c$ on the shoe overlies the outer edge of the cam, supports the shoe thereon, and prevents entrance of snow or other foreign matter between the opposed faces of said cam and shoe. End flanges $9^d$ contribute to the protection of said faces. The cam has a central flat portion for normally pressing said shoe against the rail and curved portions of longer radius. If the structure tends to travel along the rails the cam 9 acting as an automatic gripping means will rock on its pin 13 and one or the other of these longer radius portions will press against the shoe and increase its grip on the rail.

The use of the shoe provides a renewable wear part between the cam and the rail preventing the end of the cam from sliding contact with the rail. This distributes the wear over a substantially flat surface instead of localizing it on the curved faces of the cam, thus not only lessening the wear but taking it off from those surfaces the precise configuration of which should preferably be maintained.

Figure 12:
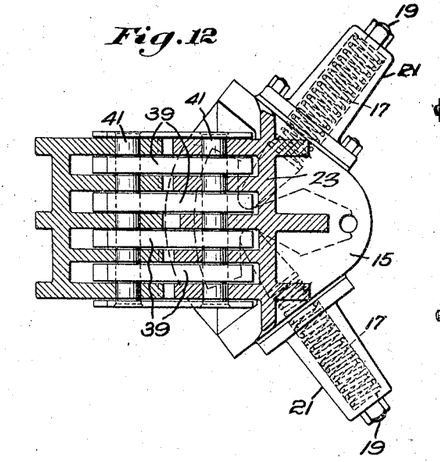
Fig. 12 is a transverse section taken on line 12—12 of Fig. 5.

To normally maintain the cam in a central position it is provided with springs 17 (Fig. 12) encircling bolts 19 contained in casings 21 diverging from said segmental housing 15.

The segmental housing 15 may be integral with an upright arm 23 (Figs. 5 and 6) having a foot 25 projecting over and resting upon the rail and adapted to slide along the same and support the arm 23 and the cam member 9.

To press the cam member against the rail at the times desired a second arm 27 may be provided opposed to the arm 23 and having a portion provided with a shoe 29 adapted for engagement with a side of the rail opposite to the cam member 9.

Figure 4:
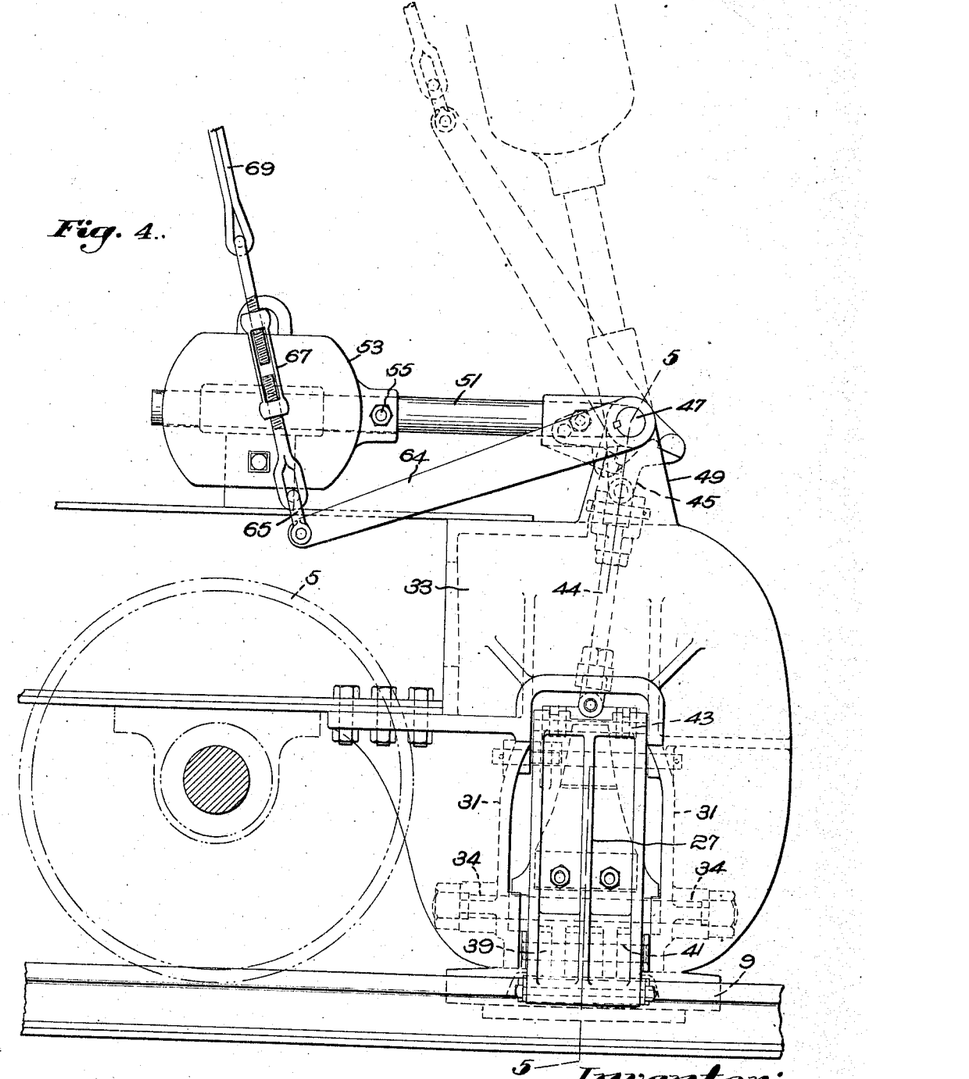
Fig. 4 on an enlarged scale is a side elevation of the rail clamping means.

The jaw arms 23 and 27 may be mounted between end walls 31 of a housing 33 which may be bolted on an end of the truck as well shown in Fig. 4. This housing provides a strong and rigid connection with the truck enabling the jaws when gripped to the rail to present an end thrust against the walls of the casing and effectively resist the travel of the truck along the rails. The walls 31 may be strengthened by a tie bolt 34 projecting through external bosses on said walls.

The jaw arm 23 may be connected by a link 35 (Figs. 5 and 6) with a fixed pivot pin 37 extending between and secured to the end walls 31 of the casing. The jaws may be pivotally connected by a series of links 39 (Fig. 12) entered into opposed recesses in said jaw arms and connected thereto by through pins 41.

When the upper end of the jaw arm 27 is rocked away from the rail or in a contra-clockwise direction (Fig. 5) it will first swing about the pin 41 and press its shoe against the outer face of the rail, after which further rocking of the jaw arm will act through the links 39 to draw its companion jaw 23 toward the opposite face of the rail and secure the truck to said rail.

Next will be described means for rocking the jaw arm 27 to apply or release the clamp as desired. To accomplish this the upper ends of the jaw arms are connected to the outer ends of toggle links 42, their meeting ends being connected to a pin 43 having a jointed connection with an upwardly extending rod 44. The upper end of this rod has a jointed connection with an arm 45 (Fig. 4) fast on a shaft 47 journaled in bearings in brackets 49 projecting upward from the casing 33 referred to. An arm 51 may be also mounted fast on said shaft and carry a heavy weight 53 which may be held at different distances on said arm from said shaft by an adjustable bolt 55.

Figure 5:
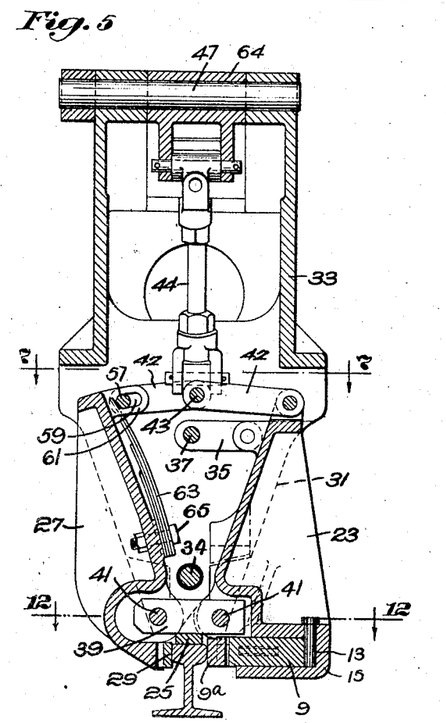
Fig. 5 is a vertical section taken on line 5—5 of Fig. 4.
Figure 6:
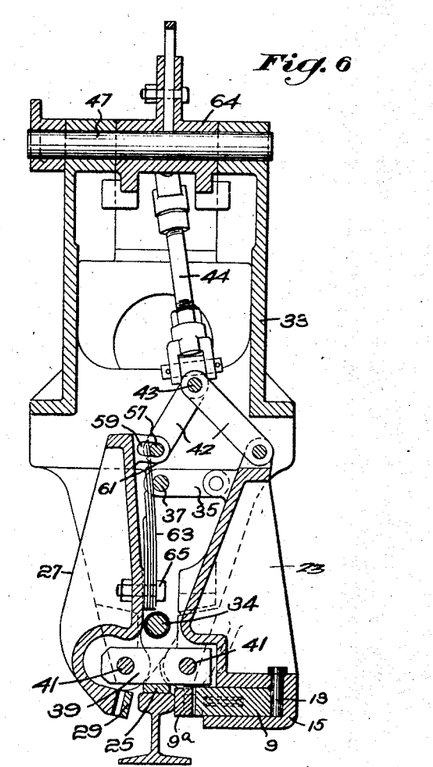
Fig. 6 is a section similar to Fig. 5 showing the parts in a different position.
Figure 7:
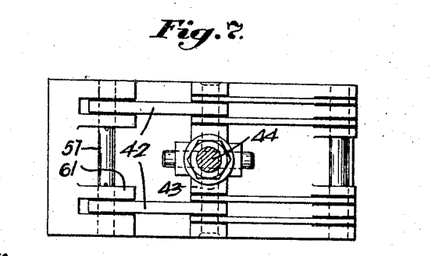
Fig. 7 is a horizontal section taken on line 7—7 of Fig. 5.

When the weight arm is rocked down to its position shown in full lines in Fig. 4, it will thrust the rod 44 downward, thereby straightening the toggle links 42 and rocking the jaw arm 27 in a contra-clockwise direction from its released position shown in Fig. 6 to its applied position shown in Fig. 5.

It will thus be seen that in addition to the jointed connection of the upper ends of the jaw arms to the toggle links 42, the lower end of the jaw arm 27 is pivoted to the links 29 while the jaw arm 23 at its upper end is jointed to the frame through the link 35 and its lower end is loosely supported by the rail through the shoe 25.

In order that the jaw 27 may be susceptible of a slight movement to compensate for variations in the width of the head of the rail, preferably its toggle link is not connected to impart a positive thrust thereto but is connected thereto by a pin 57 in an elongated slot 59 in an ear 61 projecting from said jaw arm. The pin 57 is normally pressed to the inner end of the elongated slot by the engagement of the free end of a leaf spring 63 therewith. The opposite end of said spring is securely anchored to the jaw by bolts 65. By this construction the jaw arm may move more or less relatively to its link to meet the condition referred to, it being understood that the spring 63 is of greater stiffness than the springs 17 referred to and able to apply a powerful holding pressure to the jaw of said arm.

When it is desired to release the clamp, the weight arm 51 is rocked from its full line position in Fig. 4 to its dotted line position in said figure. This will pull the rod 44 upward from its position shown in Fig. 5 to its position shown in Fig. 6, thereby buckling the toggle links and releasing the clamping jaws from the rail.

An important feature of the invention relates to means mounted on the bridge for controlling the applying and releasing of the rail clamps. To accomplish this each clamp is provided with an arm 64 (Fig. 4) fast on its shaft 47 and connected by a shackle 65 and turn buckle 67 with a cable 69 or other suitable flexible connection.

Figure 1:
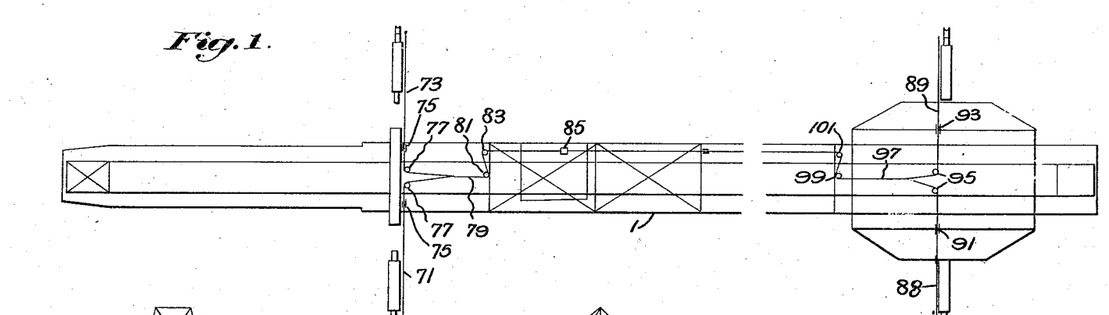
Figure 1 is a plan of a conveying structure shown herein as equipped with rail clamping means and controlling means therefor.
Figure 2:
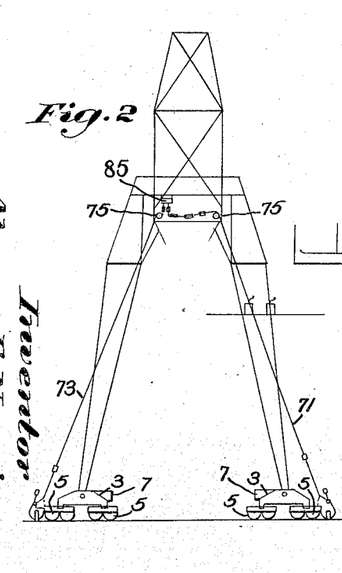
Fig. 2 is an end elevation of the structure shown in Fig. 1.
Figure 3:
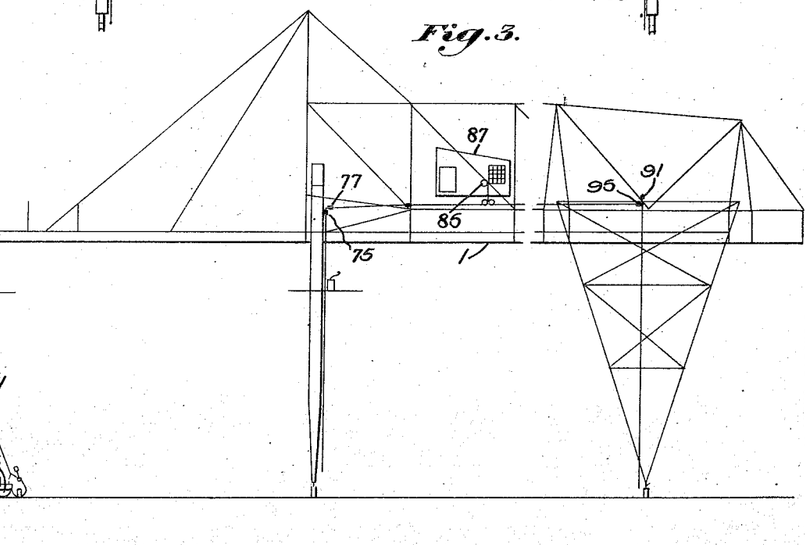
Fig. 3 is a side elevation of the structure shown in Fig. 1.

Referring now to Figs. 1, 2 and 3, to haul in or let out the several clamp-operating cables 69 there are provided cables 71 and 73 which lead from the rail clamps at the front pier upward to guide sheaves 75 and thence horizontally rearward about guide sheaves 77 (Fig. 1) to a common cable 79. This cable extends about guide sheaves 81 and 83 and is anchored to a winding drum 85 in the cab 87.

Similarly the rail clamps for the trucks at the rear pier are connected to cables 88 and 89 which extend upward about guide sheaves 91 and 93 to guide sheaves 95 and are connected to a common cable 97. This cable is guided by sheaves 99 and 101 and is anchored to the winding drum 85. The common cables 79 and 97 are connected to said drum so that when the latter is rotated in one direction it will draw the cables upward to release the clamps for all of the trucks and when said winding drum is rotated in the opposite direction it will pay out the cables and permit the weighted arms of the clamps to apply the same.

Figure 8:
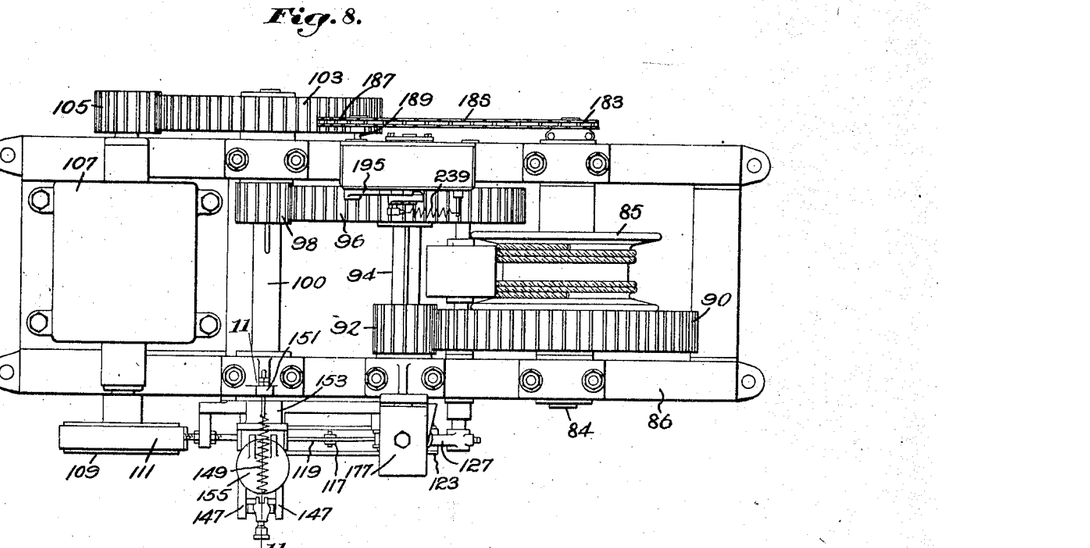
Fig. 8 is a plan of a frame carrying a winding drum for controlling the rail clamps, the motor for driving said drum, and a brake for said motor and controlling devices therefor.
Figure 9:
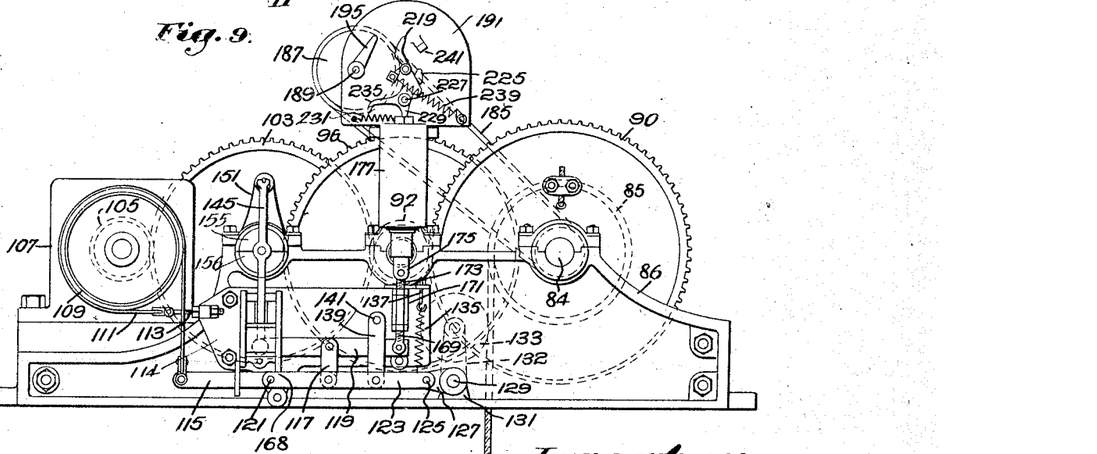
Fig. 9 is a side elevation of the mechanism shown in Fig. 8.

Referring now more particularly to Figs. 8 and 9 the winding drum 85 is mounted fast on a shaft 84 journaled in bearings in a frame 86. This shaft has a gear 90 fast thereon driven by a pinion 92 fast on a shaft 94 journaled in bearings in said frame, said shaft also carrying a gear 96 driven by a pinion 98 fast on a shaft 100 journaled in bearings in said frame. This shaft projects beyond one side of said frame and has a gear 103 fast thereon driven by a pinion 105 on the shaft of an electric motor 107.

When the motor is driven in one direction it will operate through the transmission described and drive the winding drum 85 thereby drawing upward the cables connected to the clamp controlling levers and thereby releasing the clamps. When the winding drum is permitted to rotate in the opposite direction it will allow the clamp weights 53 to drop downward and apply the clamps as described. The motor shaft is provided with a brake wheel 109 (Fig. 8) fast thereon having a strap 111 coöperating therewith. One end of said strap is anchored by a bolt 113 to a plate 114 fixed to the side of the frame 86 and the opposite end is connected to brake-controlling means about to be described. This brake-controlling means constitutes an important feature of the invention and has provision for automatically applying the brake,—to arrest the drum when it has drawn the clamp-releasing cable upward a sufficient extent to release the clamps; to arrest the drum when it has unwound the cable sufficiently to apply the clamp; to retard the unwinding rotation of the drum and prevent the cables from paying out too rapidly in allowing the downward rocking of the weighted levers in applying the clamps; and to prevent too rapid a movement of the drum in either direction.

This brake-controlling means comprises a lever 115 (Figs. 8, 9, 18 and 19) having one end connected to the brake strap 111 and its opposite end pivotally connected by a short link 117 with a floating lever 119.

The lever 115 is pivoted intermediate its ends on a pin 121 at one end of two bars constituting a main lever 123. A pin 125 at the opposite end of these bars is connected with an arm 127 fast on a shaft 129 journaled in bearings in brackets 131 on the frame 86. Arms 132 also fast on said shaft carry a wheel 133 of a width substantially equal to the width of the drum and adapted for engagement with the cables leading from said drum. These arms constitute a bell crank which is normally rocked in a clockwise direction (Fig. 19) to press said wheel against said cables by a coil spring 135 having one end connected to the arm 127 and its opposite end anchored to a bracket 137 on the frame. The main lever 123 is connected by links 139 with a fixed fulcrum pin 141 mounted on the frames.

If in lowering the weighted arms to apply the clamps the drum unwinds and pays out the cables too rapidly, the spring 135 will rock the bell crank 127 in a clockwise direction (Fig. 19) in view of the slack in the cables. In so doing it will rock the main lever 123 in a contra-clockwise direction (Fig. 19) about its point of pivotal connection with the link 139 and thereby rock the lever 115 in a similar direction about its point of pivotal connection with the link 117. This will tighten the brake strap to the brake wheel and retard the unwinding of the cables from the drum. As the cables are made taut the bell crank 127 will rock back toward its original position and automatically release the brake. Thus the proper tension for the cables will be automatically maintained. When a sufficient length of cable has unwound to apply the clamps, the cable will remain slack and the bell crank will remain in position to hold the brake applied.

One end of the floating lever 119 is connected by a shackle 143 (Fig. 11) with the curved arm of a bell crank 145 fulcrumed at 146 on a bracket 147 projecting from the frame. The other arm of the bell crank is connected to one end of a coil spring 149 the opposite end of which is anchored to a bracket 151 projecting upward from the frame.

The bell crank is adapted to be rocked in a clockwise direction (Fig. 11) by a governor comprising a head 153 secured to an end of the transmission shaft 100 referred to acting in conjunction with semi-spherical governor weights 155 and 156 mounted on arms 157 pivotally connected at 158 to said head. Pins 159 project from said arms into elongated slots in ears of a collar 161, said collar being mounted on the reduced end of a spindle 163 projecting from a bore in said head outward between the governor weights and having a head 165 seated in a cup-shaped bearing 167 in the bell crank arm.

Figure 11:
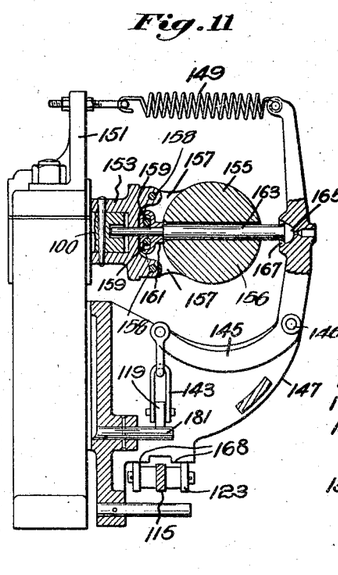
Fig. 11 on an enlarged scale is a vertical section taken on line 11—11 of Fig. 8 through the governor.

When the winding drum attains a sufficient speed of rotation, it will cause the governor weights to separate or fly outward by centrifugal force and shift the collar 161 to the right of Fig. 11 thereby in turn shifting the spindle 163 to the right and swinging the bell crank in a clockwise direction against the resistance of its spring 149. This will cause the shackle 143 to pull upward on the end of the floating lever 119 to which it is connected and with it the link 117. This will draw the lever 123 up against a fixed stop 168 (Fig. 9) on the frame and rock the lever 115 in a contra-clockwise direction on its pin 121, thereby tightening the brake strap on its wheel with a force varying according to the speed of rotation of the drum. Thus, the governor will serve automatically to prevent an over rapid downward rocking of the weighted levers in applying the clamp.

Figure 10:
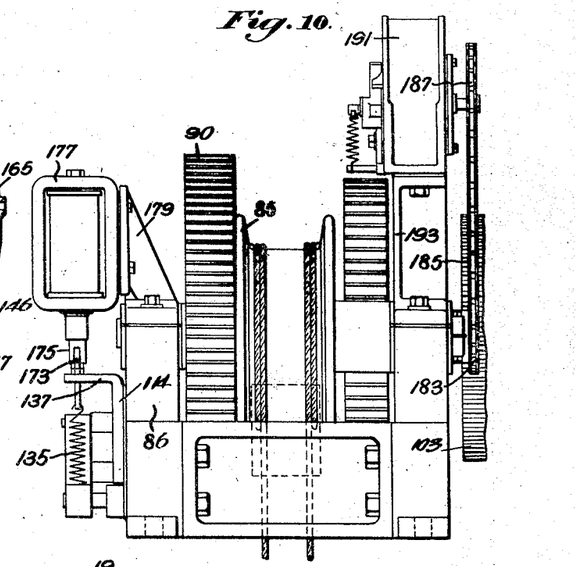
Fig. 10 is an end elevation of the mechanism shown in Figs. 8 and 9.

The opposite end of the floating lever 119 is pivotally connected to a rod 169 (Fig. 19) adjustably connected by a turn buckle 171 with a rod 173 pivotally connected to the plunger 175 of a solenoid 177 mounted on a bracket 179 (Fig. 10) on the frame. This solenoid when energized as more fully hereinafter described will pull its plunger upward and thereby lift the end of the floating lever 119 to which it is attached. The end of the floating lever which is connected to the governor is normally held by the spring-drawn bell-crank 145 down against a stop pin 181 (Fig. 11) projecting outward from the frame so that the further downward movement of that end of the floating lever is prevented and the upward solenoid-actuated movement of the plunger 175 acts to rock the floating lever about this pin as a fulcrum and through the short link 117 will rock the lever 115 about the pin 121 in a contra-clockwise direction, thereby tightening the brake strap to the brake wheel and causing the arrest of the motor.

To cause the brake-applying solenoid to be energized as soon as the clamp-releasing motor is stopped and to permit the clamp-releasing motor to be actuated only when the brake-applying solenoid is de-energized, suitable automatic switching devices are employed. To actuate such switching devices there is employed a sprocket wheel 183 (Fig. 8) mounted on one end of the drum shaft 84 and connected by a sprocket chain 185 with a larger sprocket wheel 187 fast on a shaft 189 journaled in bearings in a casing 191 (Figs. 9, 10 and 13 to 17) mounted on a bracket 193 on the frame. The shaft 189 projects through said casing and on the opposite side thereof is provided with an arm 195 fast thereon.

A shaft 197 is journaled in bearings centrally of said casing and has a switch 199 fast thereon within the casing which switch controls the circuits for the clamp-releasing motor and the brake-controlling solenoid. When this switch is in the position shown in Fig. 15 it connects a spring finger 201 mounted on a bracket 203 in the casing, with a spring finger 205 mounted on a bracket 207 in the casing, the fingers 201 and 205 being located in the brake solenoid circuit, as will more fully appear from the description of the controlling circuits which follows: When the switch is rotated through an arc of 90° it will break connection with the spring fingers 201 and 205 and interrupt the circuit for the brake-applying solenoid and connect a spring-contact finger 209 on a bracket 211 in the casing with a spring-contact finger 213 on a bracket 215 in the casing, the fingers 209 and 213 being in the circuit of the clamp-releasing motor.

To shift the switch as described the shaft carrying the same may be provided with a lever 217 having a toe 219 adapted to be engaged by the arm 195 as more fully hereinafter described. Said lever has a heel 221 provided with an offset lug 223 adapted to be engaged by a lock dog 225 on a stud shaft 227 projecting from the casing 191. A bell crank 229 may be formed integral with said dog and have one arm connected to one end of a coil spring 231, the opposite end of which is anchored to the casing. This spring tends to rock the dog in a clockwise direction until limited by the stop pin 233. The bell crank has a finger 235 adapted to be engaged by the arm 195 to trip the dog as more fully hereinafter described. The lever 217 referred to has an arm 237 integral therewith connected to one end of a coil spring 239, the opposite end of which is anchored to the casing. This spring tends to rock the lever 217 in a contra-clockwise direction until limited by the engagement of said lever with a stop 241 projecting from the casing.

Figure 13:
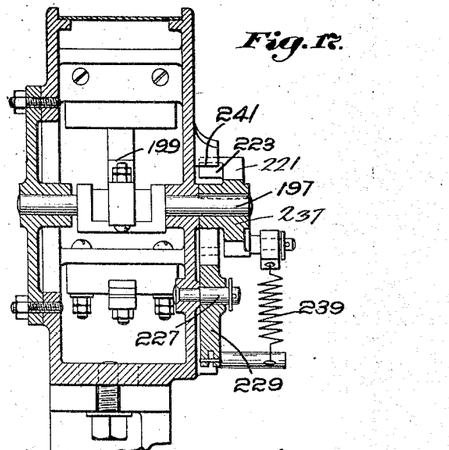
Fig. 13 is a side elevation of an electrical switch-controlling device.
Figure 14:
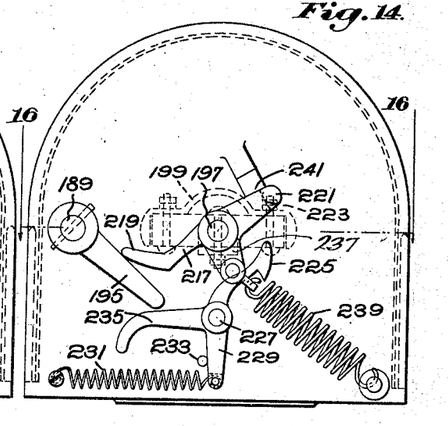
Fig. 14 is a view similar to Fig. 13 showing the parts in a different position.
Figure 15:
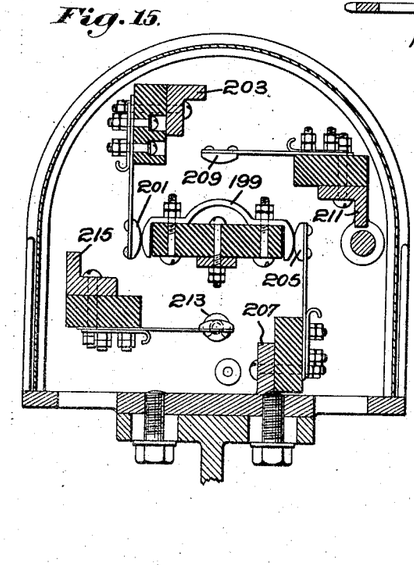
Fig. 15 is a vertical section through the switch device shown in Figs. 13 and 14.
Figure 16:
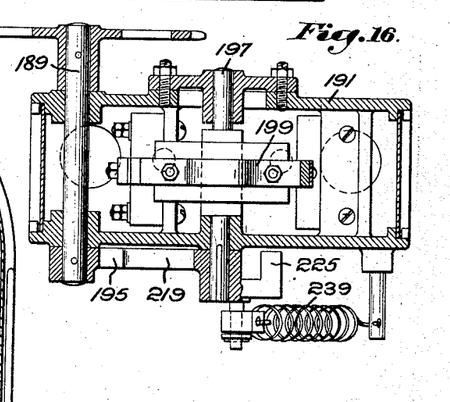
Fig. 16 is a horizontal section taken on line 16—16 of Fig. 14.
Figure 18:
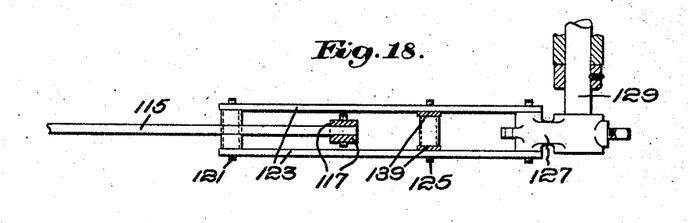
Fig. 18 on an enlarged scale is a view partly in plan and horizontal section of the system of levers for controlling the brake.
Figure 19:
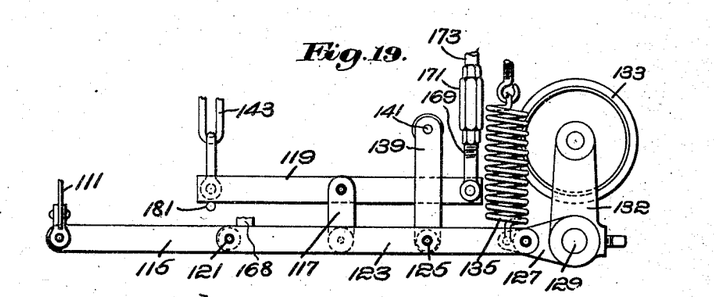
Fig. 19 is a side elevation of the system of levers shown in Fig. 18.

It may be assumed the arm 195 is in its position shown in dotted lines in Fig. 13 when the clamp operating weight arms are in position to apply the clamps to the rails, and that it is desired to release the clamps. To acomplish this the motor is started, thereby rotating the winding drum and causing the clamp releasing cables to be wound thereon. During this winding movement of the drum the sprocket wheel 183, chain 185, and sprocket wheel 187 will impart rotation, but at a slower speed, to the shaft 189. This will cause the arm 195 to travel from its position shown in dotted lines (Fig. 13) in a clockwise direction until it reaches the dog finger 235. As the arm 195 continues to move it rocks the dog in a contra-clockwise direction against the resistance of its spring 231 and trips the dog from the lug 223 on the heel of the lever 217. This renders the spring 239 effective to cause the lever 217 to fly around in a contra-clockwise direction until limited by the engagement of its lug 223 with the stop 241. This will shift the switch 199 with a sharp, quick movement from its position shown in dotted lines in Fig. 13 to its position shown in full lines in Fig. 15 and break the circuit to the motor and complete a circuit to be described.

When the drum unwinds the cable to apply the clamps, it will cause the arm 195 to rotate in a contra-clockwise direction from its dotted to its full-line position (Fig. 13) and thereby reset the lever 217 in readiness for the next clamp-applying operation.

Figure 20:
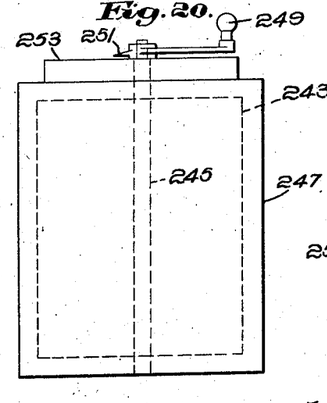
Fig. 20 is a side elevation of the electrical controller.
Figure 21:
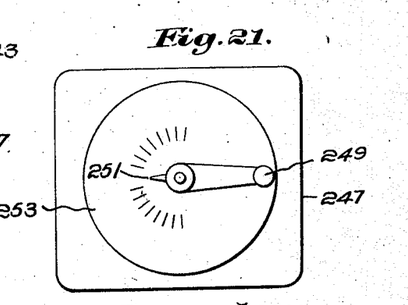
Fig. 21 is a plan of said controller.

Next will be described a controller and circuits for the motors for propelling the bridge-supporting trucks, for the brakes for said motors, for the motor for controlling the rail clamp cables, and for the brake for the latter motor. This controller comprises a drum 243 (Fig. 20) mounted on a shaft 245 journaled in bearings in a casing 247. The upper end of said shaft has a handle 249 fast thereon provided with an index 251 movable over a dial plate 253 having the different controller positions marked thereon.

Figure 22:
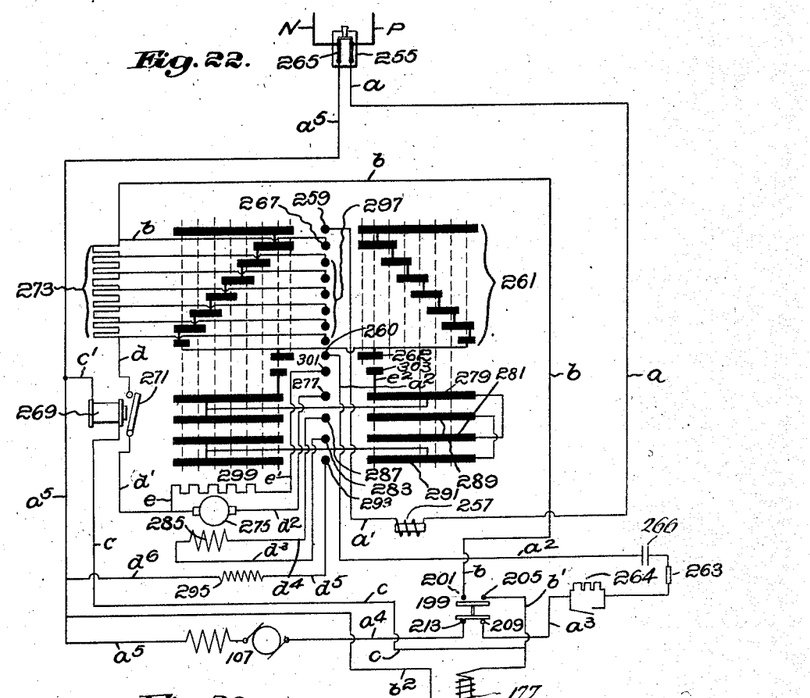
Fig. 22 is a diagrammatic view including a development of the drum, contact segments and devices, and electrical connections coöperating therewith.

The circuit controlled by the drum comprises a main positive line P (Fig. 22) connected by a switch 255 with a conductor $a$ leading to a blow-out coil 257, connected in turn by a conductor $a'$ with a stationary contact 259 adjacent the drum. When the drum is shifted to the left of Fig. 22 for forward driving, the stationary contact 259 is connected with a stationary contact 260 by a series of contact segments 261 and a short contact segment 262 on the drum. The stationary contact 260 is connected by a conductor $a^2$ through a switch 266 with a fuse 263, connected with a self-starter 264, the latter being connected by a conductor $a^3$ with the spring finger contact 209 referred to, adapted to be connected by the switch 199 with the spring finger contact 213. This contact is connected by a conductor $a^4$ with the armature and field of the clamp release motor 107 referred to. This motor is connected to a conductor $a^5$ leading to a switch 265 for connecting the same with the main negative line N.

When the controller drum is shifted to the left sufficiently to bring the contact segments 261 and 262 in position to connect the stationary contacts 259 and 260, the circuit will be completed to the clamp releasing motor, thereby causing the same to rotate the winding drum, pull up the clamp-releasing cables and thereby release the clamps. When the winding drum has rotated sufficiently to release the clamps the switch-actuating arm 195 referred to will have been rotated by its sprocket and chain connections with the winding drum shaft, sufficiently to trip the dog 225. This will cause the switch 199 to snap from its position shown in dotted lines in Fig. 13 to its position shown in full lines in Fig. 15. In the course of this movement it automatically breaks the circuit to the clamp-releasing motor.

The solenoid 177 should be energized to apply the clamp motor brake on the interruption of the drum actuating motor circuit, to hold the clamp-applying weights up in releasing position. To accomplished this, there is provided a stationary contact 267 adjacent the drum connected by a conductor $b$ with the spring finger contact 201 referred to adapted to be connected by the switch 199 to the spring finger contact 205. This contact is connected by a conductor $b'$ with the brake-applying solenoid 177, the latter being connected in turn by a conductor $b^2$ leading to the conductor $a^5$ referred to, and thence to the main negative line. When the switch 199 was shifted to break the motor circuit it completed the circuit just described to the solenoid, thereby energizing the latter and applying the brake.

To start the truck motors 7 for producing the travel of the bridge after release of the rail clamps, a conductor $c$ is tapped from the conductor $b'$ referred to, and is connected to a magnet 269, connected in turn by a conductor $c'$ with the conductor $a^5$ leading to the main negative line. When the switch 199 is shifted as described it will complete the circuit to and energize the magnet 269. This magnet is used to close a switch 271 in the circuit to the bridge propelling motors. This circuit comprises a conductor $d$ leading from the conductor $b$ referred to through a series of resistances 273 to the switch 271, the latter being connected by a conductor $d'$ with the armature 275 of a typical truck motor 7. This armature is connected by a conductor $d^2$ with a stationary contact 277 adjacent the drum. When the drum is shifted sufficiently to the left, this stationary contact is connected by contact segments 279 and 281 on the drum with a stationary contact 283. The latter is connected by a conductor $d^3$ with the field 285 of the truck motor 7, said field being connected in turn by a conductor $d^4$ with a stationary contact 287. This contact is adapted to be connected by connected contact segments 289 and 291 on the drum with a stationary contact 293. This contact is connected by a conductor $d^5$ with a coil 295 for the brake (not shown) of a truck motor. This coil is connected by a conductor $d^6$ to the conductor $a^5$ leading to the main negative line.

When the switch 199 is shifted to break the clamp motor circuit as stated, the magnet 269 is energized, thereby automatically closing the switch 271 in the circuit for the truck motor. This circuit, however, is not yet complete since the connected contact segments 279, 281 and the connected contact segments 289, 291 in said circuit are located on the controller drum slightly back from the contact segments 261, 262 on said drum. Consequently it is necessary to shift the drum somewhat farther to the left of Fig. 22 to cause said segments 279, 281 and 289, 291 to contact with the stationary contacts with which they coöperate. When the drum is so shifted the truck motor circuit described will be completed and the brakes will be released and the motors will start and propel the bridge along the rails. As the drum is shifted farther to the left it will bring the series of contact segments 261, referred to, progressively into engagement with a series of stationary contacts 297 connected with the resistances 273 referred to, and thereby progressively cut out said resistances and increase the speed of the truck motor.

When it is desired to reverse the direction of movement of the bridge the controller drum is shifted to the right, thereby completing the circuits as described through contact segments on the drum similar to those described.

Means may be provided for automatically preventing the wind from causing the bridge structure to drift at a speed substantially in excess of the starting speed of the truck motor. To accomplish this a conductor $e$ may be tapped from the conductor $d'$ referred to and be connected with a resistance 299 in shunt across the armature of the motor, said resistance being connected by a conductor $e'$ with a stationary contact 301 adapted to be connected to a short contact segment 303 on the drum, said segment being connected by a conductor $e^2$ with the contact segment 279 referred to. When the drum is shifted to start the motor, the short contact segment 303 will engage the stationary contact 301, thereby completing the circuit through the shunt resistance 299. If the wind causes the bridge to travel at a speed substantially greater than that called for by the connections effected in that position of the controller, the counter-electro-motive force set up will produce a current in the shunt coil and will cause the motor to act as a brake and tend to prevent such excess speed.

By the controller described it is impossible to start the truck motors prior to the release of the clamp motor, since the circuit to the truck motors cannot be completed until the clamps have been completely released, since the switch 199 in the truck motor circuit is not shifted until the clamp motor has rotated sufficiently completely to release the clamps. If the controller is shifted to move the short contact segment 262 beyond its fixed contact 260 before the clamp motor has had time to release the clamps, the circuit to said motor will be broken and the drum will pay out the cables and permit the weights to reapply the clamps.

After the bridge has been propelled the desired distance, the controller handle may be turned to shift the drum back to its original position to break the connection of the contact segments thereon with the stationary contacts. This will arrest the bridge-conveying motors, apply their brakes, deënergize the solenoid for the clamp motor brake to release the same and permit the drum to pay out the cables, and the weights to apply the clamps to secure the trucks to the rails.

The rotation of the winding drum in paying out the cables resets the switch actuating arm 219 and shifts the switch 199 to its position shown in Fig. 13, where it is in readiness to complete the circuit to the clamp release motor the next time the controller drum is shifted to cause the contact segments 261 to connect the stationary contacts 259 and 260 in the clamp motor circuit.

It is not always desirable to apply the clamps immediately on the arrest of the truck motors, since immediately after stopping it may be necessary to restart the truck motors to advance the bridge somewhat in order to accurately locate the same. By positioning the truck motor contact segments slightly back of the clamp release contact segments on the drum, the latter can be turned to the right sufficiently to interrupt the truck motor circuit without interrupting the circuit to the brake for holding the rail clamps released. Thus the drum can be turned at once back to the left to complete the circuit to and restart the truck motors without the necessity of applying and releasing the clamps in the meantime.

If the controller drum is shifted sufficiently to the left to cause both the contact segments of the clamp release motor circuit and the contact segments of the truck motor circuit to engage the stationary contacts which coöperate therewith, it will be unnecessary to further shift the drum to complete the truck motor circuit after shifting the same to complete the clamp release motor circuit, but said truck motor circuit will be completed automatically on the closing of the switch 271 in its circuit as described.

The controller described may be located on the bridge where conveniently accessible for controlling the travel and arrest thereof.

The term "clamp" herein is used in a broad, generic sense and is to be understood to include any means for securing the conveying structure to the rail.

Having described one illustrative embodiment of the invention without limiting the same thereto, what I claim as new and desire to secure by Letters Patent is:—

1. The combination with a rail clamp of controlling means therefor including a weighted arm, a drum, a cable connecting said arm and drum, a motor for rotating said drum to take up said cable and release said clamp, a brake for said drum, and means for automatically applying said brake after said cable has been wound on said drum sufficiently to release said clamp.

2. The combination with a rail clamp of controlling means therefor including a weighted lever, a drum, a cable connecting said lever and drum, a brake, and means for automatically applying said brake to retard the paying out of said cable in applying said clamp.

3. The combination with a rail clamp of controlling means therefor including a weight for applying said clamp, a drum, a cable connecting said weight and drum, a brake, and means for automatically applying said brake to arrest said drum when a sufficient length of cable has been unwound from said drum to apply said clamp.

4. The combination with a rail clamp of controlling means therefor including a weight for applying said clamp, a drum, a cable connecting said weight and drum, a motor for rotating said drum, a brake, means for automatically applying said brake to arrest said drum when said cable has been taken up sufficiently to release said clamp, speed-responsive means for applying said brake to retard the unwinding of said cable from said drum in applying said clamp, and means for automatically applying said brake in response to slack in said cable.

5. The combination with a rail clamp of controlling means therefor including a cable, a winding drum therefor, a motor for rotating said drum, a brake, means for applying said brake after said drum has been rotated sufficiently to release said clamp, means for automatically applying said brake to limit the unwinding speed of said drum, and means automatically to apply said brake after said drum has rotated sufficiently to apply said clamp.

6. The combination with a rail clamp of controlling means therefor including a cable, a winding drum, a motor for said drum, a brake, a system of levers connected to said brake, and means coöperating with said levers for automatically applying said brake to limit the winding of said cable to release said clamp and to automatically check the unwinding of said cable in applying said clamp.

7. The combination with a rail clamp of controlling means therefor including a cable, a winding drum, a motor for said drum, a brake, means for automatically applying said brake to arrest said drum when said cable has been taken up sufficiently to release said clamp, and means automatically to apply said brake to arrest said drum when a sufficient length of cable has been unwound therefrom to apply said clamp.

8. The combination with a rail clamp of controlling means therefor including a cable, a winding drum, a motor for said drum, a brake, and means for actuating said brake including a main lever, a brake lever fulcrumed on said main lever, a floating lever pivotally connected to said brake lever, speed-responsive means connected to one end of said floating lever, and electro-magnetic means connected with the opposite end of said floating lever.

9. The combination with a rail clamp of controlling means therefor including a cable, a winding drum, a motor for said drum, a brake, a main lever, a brake lever connected to said brake and fulcrumed on said main lever, a floating lever pivotally connected intermediate its ends to said brake lever, a governor connected to one end of said floating lever, and an electro-magnet connected to the opposite end of said floating lever.

10. The combination with a rail clamp of controlling means therefor including a cable, a winding drum, a motor for said drum, a brake, and means for actuating said brake, including a main lever, a bell crank fulcrumed thereon having a cable-engaging element on one arm thereof, a spring connected to the other arm thereof, a brake lever fulcrumed on said main lever connected to said brake, a floating lever connected to said brake lever, speed-responsive means connected to one end of said floating lever, and electro-magnetic means connected to the opposite end of said lever.

11. The combination with a rail clamp of controlling means therefor including a cable, a winding drum therefor, a motor for said drum, a brake, and means for actuating the latter including a main lever, means for limiting the rocking of said main lever in one direction, a brake lever connected to said brake, a floating lever connected to said brake lever, and speed-responsive means connected to said floating lever for drawing said main lever against said limiting means and rocking said brake lever to actuate said brake.

12. The combination with a rail clamp of controlling means therefor including a cable, a winding drum, a motor for said drum, a brake, a main lever, means for limiting movement thereof in one direction, a brake lever connected to said brake fulcrumed on said main lever, a floating lever connected to said brake lever, and means connected to said floating lever for rocking the latter on said brake lever to actuate said brake.

13. The combination with a rail clamp of controlling means therefor including a cable, a winding drum, a motor for said drum, a brake, a main lever, a brake lever fulcrumed thereon, a floating lever connected to said brake lever, stops, and means connected to said floating lever for drawing the latter and said main lever against said stops and rocking said brake lever on said main lever to apply said brake.

14. The combination with a rail clamp of controlling means therefor including a cable, a winding drum, a motor for said drum, a brake for the latter, a main lever, a brake lever fulcrumed thereon connected to said brake, a floating lever connected to said brake lever, stop means, and means for drawing said floating lever against said stop means and rocking said brake lever on said main lever to apply said brake.

15. The combination with a rail clamp of controlling means therefor including a cable, a winding drum, a motor for said drum, a brake, a support, a main lever fulcrumed on said support, a brake lever connected to said brake and fulcrumed on said main lever, a floating lever connected to said brake lever, speed-responsive means and cable-winding limiting means connected to said floating lever and alternatively operable for rocking said floating lever and brake lever to apply said brake.

16. The combination with a rail clamp of controlling means therefor including a cable, a winding drum connected to said cable, a motor for said drum, a brake for the latter, and controlling means for said brake including a main lever, cable-engaging means fulcrumed thereon, a brake lever connected to said brake and fulcrumed on said main lever, a floating lever connected to said brake lever, stops coöperating with said main and floating levers, and speed-responsive and cable-winding limiting means connected to said floating lever.

17. The combination with a rail clamp of controlling means therefor including a cable, a winding drum, a motor for the latter, a brake, and controlling means for said brake including a main lever, cable-engaging means fulcrumed on said main lever, a brake lever connected to said brake and fulcrumed on said main lever, a floating lever, a link connecting the latter with said brake lever, speed-responsive means connected to one end of said floating lever, and cable-winding limiting means connected to the opposite end of said floating lever.

18. The combination with a rail clamp of controlling means therefor including a cable, a winding drum, a motor for said drum, a brake, and controlling means for said brake including a main lever, a support, a link pivotally connected to said main lever and support, cable-engaging means fulcrumed on said main lever, a brake lever connected to said brake and fulcrumed on said main lever, a floating lever, a link pivotally connecting the latter with said brake lever, speed-responsive means connected to one end of said floating lever, and cable-winding limiting means connected to the opposite end of said floating lever.

19. The combination with a conveying structure of means to clamp the same to a rail, a motor for causing said structure to travel along said rail, means including a motor for releasing said clamp means, electrical circuits for said motors, a controller for said circuits, and means to prevent said controller from completing said conveying motor circuit until after the completion of said clamp motor circuit.

20. The combination with a conveying structure of means to clamp the same to a rail, means including a motor for causing said structure to travel along said rail, means including a motor for releasing said clamp means, electrical circuits for said motors, a controller for jointly controlling said circuits to said motors, and means to prevent starting said conveying motor prior to release of said clamp means by its motor.

21. The combination with a conveying structure of means to clamp the same to a rail, a motor for said structure, a motor for releasing said clamp means, circuits for said motors, a controller for said circuits, means to prevent completion of said conveyer motor circuit prior to the completion of said clamp release motor circuit, and electromagnetic means for automatically completing said conveyer motor circuit after release of said clamp means.

22. The combination with a conveying structure of a motor for propelling the same along a rail, means to clamp said structure to said rail, means for releasing said clamp means including a cable, a winding drum, a motor for said drum; circuits for said motors, a controller for said circuits, and means for completing said conveyer motor circuit including a switch in said circuit, an electromagnet and a circuit for the latter for automatically closing said switch after said drum has wound a sufficient portion of said cable thereon to release said clamp means.

23. The combination with a conveying structure of a motor for propelling the same along a rail, means to clamp said structure to said rail, a motor for releasing said clamp means, a brake for the latter motor, circuits for said motors and brake, and a controller for said circuits having means to prevent starting said conveyer motor and applying said brake prior to release of said clamp means by its motor.

24. The combination with a conveying structure of a motor for propelling the same along a rail, means to clamp said structure to said rail, a motor for releasing said clamp means, a brake for the latter motor, circuits for said motors and brake, a controller for said circuits, and means set in operation by movement of said controller for automatically starting said conveyer motor and applying said brake on release of said clamp means by its motor.

25. The combination with a conveying structure of means for clamping the same to a rail, and controlling means for said clamp means including a cable, a drum, a shaft, a switch thereon, a lever on said shaft, a stop, a spring tending to urge said lever against said stop, a trigger for holding said lever in tensioned position, and means actuated from said drum for tripping said trigger to release said lever and shift said switch, or to reset said lever.

26. The combination with a conveying structure of means to clamp the same to a rail, and controlling means for said clamp means including a switch, a shaft therefor, a lever fast on said shaft, a stop, spring means tending to rock said lever against said stop, a trigger to hold said lever away from said stop, and means driven from said drum, rotative in one direction to trip said trigger, and rotative in the opposite direction to reset said lever.

27. The combination with a conveying structure of means to clamp the same to a rail, and controlling means for said clamp means including a switch and an operating device for said switch including means for energizing said device and rendering said device effective to shift said switch.

28. The combination with a conveying structure of means to clamp the same to a rail, and controlling means for said clamp means including two sets of contacts, a bridge contact for alternately connecting the contacts of said sets, and means for shifting said bridge contact with a sharp, quick movement.

29. The combination with a conveying structure of means to clamp the same to a rail, and controlling means for said clamp means including two sets of contacts, a bridge contact for alternately connecting the contacts of said sets, and a device for shifting said bridge contact having provision for energizing and then suddenly rendering the same effective to shift said bridge contact.

30. The combination with a truck of a casing mounted thereon, jaws for gripping a rail having arms in said casing, toggle links connecting said jaws, a rock shaft journaled in said casing, an arm on said shaft, a rod connecting said arm with said toggle links, a lever fast on said shaft and a weight on said lever for straightening said toggle and causing said jaws to grip the rail.

31. The combination with a truck of a casing mounted thereon, jaws for gripping a rail having arms in said casing, toggle links connecting said jaws, and means mounted on said casing connected to said links for straightening the latter and causing said jaws to grip said rail.

32. The combination with jaws for gripping a rail, of arms therefor, and means for closing said jaws including toggle links, one of the latter having a yielding connection with one of said arms.

33. The combination with jaws for gripping a rail, of arms therefor, an ear projecting from one of said arms having an elongated slot, toggle links, one of the latter having a pin in said slot, and spring means on one of said arms tending to press said pin against an end of said slot.

34. The combination with jaws for gripping a rail, of arms therefor, and means for operating said jaws including toggle links and means yieldingly to transmit movement from one of said links to one of said arms.

35. The combination with jaws for gripping a rail, of means for applying or releasing said jaws including toggle links, and means including a spring for transmitting movement from one of said links to one of said jaws.

36. The combination with jaws for gripping a rail, of toggle means for applying or releasing the same having provision for compensating for variations in the width of the rail.

37. The combination with a rail clamp of controlling means therefor including a cable 71, a drum 85, a motor 107 for driving said drum, a brake 111, and controlling means for said brake including a main lever 123, a brake lever 115 fulcrumed thereon, a floating lever 119 connected to said brake lever, a governor connected to one end of said floating lever, a solenoid 177 connected to the opposite end of said floating lever, and means 127 connected to said main lever and having an element 133 for engagement with said table.

38. The combination with a rail clamp of actuating means for releasing said clamp, and means including a brake for automatically arresting said actuating means on release of said clamp.

39. The combination with a rail clamp of actuating means for releasing said clamp, and means responsive to the speed of the clamp releasing means and for controlling said actuating means.

40. In a traveling bridge, the combination with a plurality of rail clamps, of means for releasing said clamps including cables connected thereto, a motor for hauling in said cables, and means responsive to the movement of said cables for controlling said motor.

41. The combination with a rail clamp, of controlling means therefor including a weight, a drum, a cable connecting said weight and drum, a motor, and means responsive to the speed of the cables for controlling the speed of the motor.

42. In a traveling bridge, the combination with a plurality of rail clamps, of cables connected thereto, means to haul in and pay out said cables to actuate said clamps, and means responsive to slack in said cables to control the actuation of said clamps.

43. The combination with a rail clamp of a cable connected thereto, means to pay out said cable to actuate said clamp, and means responsive to slack in said cable to control the actuation of said clamp.

44. The combination with a rail clamp of weight means to apply the same to a rail, a cable for actuating said weight means to release said clamp, and means responsive to slack in said cable to check said weight means in applying said clamp.

45. The combination with a rail clamp of weight means to apply the same to a rail, a cable connected to said clamp, means to take up said cable to release said clamp, means automatically to limit the movement of said take-up means, and slack and speed-responsive means coöperating with said cable to check movement of said weight means.

46. The combination with a conveying structure of a motor for propelling the same, means to clamp said structure to a rail, means including a motor for controlling said clamp means, a brake for the latter motor, operating means for said brake, electrical circuits for said motors and said brake-operating means, switch means for said circuits, and means automatically to shift said switch means to break said clamp motor circuit and complete said conveying motor and brake-operating means circuits on release of said clamp means.

47. The combination with a rail clamp of controlling means therefor including a motor, a circuit for said motor, a brake for said motor, operating means for said brake, a circuit for said operating means, switch means for said circuits, and means automatically to shift said switch means to interrupt said motor circuit and complete said brake-operating means circuit on release of said clamp means.

48. The combination with a rail clamp of means for controlling the same including a motor, a circuit for said motor, a brake for said motor, operating means for said brake, a circuit for said operating means, a controller drum having contact segments thereon for completing said motor circuit, and means for automatically breaking said motor circuit and completing said brake-operating means circuit on release of said clamp.

49. The combination with a conveying structure of a motor for propelling the same along a rail, means to clamp the structure to the rail, a motor for controlling said clamp means, circuits for said motors, a controller drum having contact segments thereon for completing said clamp motor circuit and making a portion of the conveying motor circuit, and means for automatically breaking the clamp motor circuit and completing the conveying motor circuit on release of said clamp means.

50. The combination with a conveying structure of a motor for propelling the same along a rail, and means automatically acting as a brake to limit wind drifting of the structure in substantial excess of a predetermined speed.

51. The combination with a conveying structure of a motor for propelling the same along a rail, and means including a resistance in shunt with said motor for preventing wind drifting of the structure substantially beyond a predetermined speed.

52. The combination with a conveying structure of motor means for propelling the same along a rail, a resistance in shunt with said motor, and a controller for said motor having provision for completing the circuit through said resistance when said controller is set to start said motor.

53. The combination with a conveying structure of means to clamp the same to a rail, means to propel said structure along the rail, and controlling means for said clamping and propelling means having provision for arresting and restarting said propelling means prior to clamping the structure to the rail.

54. The combination with a conveying structure of means to clamp the same to a rail, means to propel said structure along the rail, and controlling means for said clamping and propelling means having provision for arresting said propelling means and applying said clamping means, or arresting said propelling means without applying said clamping means at will.

55. The combination with a conveying structure of means to clamp the same to a rail, means including an electric circuit to control said clamp means, means including a motor to propel the structure along said rail, an electric circuit for said motor, and controlling means for said circuits having provision for making or breaking said motor circuit without interrupting said clamp control circuit.

56. A rail clamping device comprising a shoe for engagement with a rail, a cam member for engagement with said shoe having portions of varying radius, and means tending to present a shorter radius portion of said member opposite said shoe and yieldable to automatically present a longer radius portion opposite said shoe when the device tends to move along the rail.

57. A rail clamping device comprising a shoe for engagement with a rail, and means to press said shoe against the rail including a member out of contact with the rail adapted to rock relatively to said shoe automatically to increase its pressure against said rail.

58. A rail clamping device comprising a shoe for engagement with a rail, and means to press said shoe against said rail including a member having a tooth connection with said shoe and adapted to rock relatively thereto to increase its pressure against said rail.

59. A rail clamping device comprising a shoe for engagement with a rail, and means to press said shoe against said rail including a member out of contact with the rail having portions of different radius and adapted to rock and automatically increase the pressure of the shoe against the rail.

60. A rail clamping device comprising opposed jaws, means to draw the same toward said rail, and a protecting shoe for one of said jaws having flange means to support the shoe on said jaw and a tooth for interlocking engagement with said jaw.

61. A rail clamping device comprising a shoe, and a jaw provided with a face for engagement with said shoe having portions curved on a radius greater than an intermediate portion of said face for automatically increasing the pressure of said shoe against said rail if the device tends to move along the rail.

62. A rail clamp device for securing a traveling structure to a rail, comprising coöperating clamping devices for gripping between them a portion of the rail, means controllable by an operator for actuating said clamping devices to clamp said structure to the rail, one of said devices including a movable member and a shoe coöperating therewith, the movable member being adapted to be displaced by frictional contact of the shoe with the rail when the structure starts to move from a position where it is clamped, said member by its movement serving to press said shoe into closer gripping engagement with the rail and bringing both said devices into closer gripping relation to the gripped rail portion.

63. A rail clamp device for securing a traveling structure to a rail, comprising coöperating clamping devices for clamping between them a portion of the rail, one of said devices being provided with a shoe, means for placing the shoe in frictional contact with the rail, said shoe when applied to the rail being adapted to be displaced by frictional contact therewith when the structure starts to move in either direction, and means on the clamping means out of contact with the rail for moving the shoe into closer frictional contact with the rail when the structure starts to move in either direction, said frictionally actuated movement of the shoe serving to bring both said clamping devices into closer gripping relation to the rail.

64. A rail clamp device for securing a traveling structure to a rail, comprising opposed clamping jaws carried by said structure and arranged when applied to grip a portion of the rail between them, one of said jaws having a shoe, means for moving said jaw to place said shoe in frictional contact with the rail, said shoe when applied to the rail being adapted to be displaced by frictional contact therewith when the structure starts to move, automatic gripping means on the jaw for forcing the shoe into closer frictional contact with the rail when the shoe is displaced by movement of the structure, and connections between the jaws to cause such closer frictional contact to draw said jaws into closer gripping relation to the rail.

65. A rail clamp device for a traveling structure having coöperating members, means controllable by an operator for clamping between them a portion of the rail, a shoe on one of said members, automatic gripping means coöperating with the shoe for forcing the shoe into close gripping engagement with the rail when the clamping structure starts to move, said increased gripping engagement serving to increase the gripping engagement of both clamping members with the rail portion.

66. A rail clamp device for a traveling structure having coöperating members, means controllable by an operator for clamping between them a portion of the rail, a shoe on one of said members, automatic gripping means out of contact with the rail and coöperating with the shoe for forcing the shoe into close gripping engagement with the rail when the clamping structure starts to move, said increased gripping engagement serving to increase the gripping engagement of both clamping members with the rail portion.

67. The combination with a conveying structure, of a propelling motor, a rail clamp, means to release the clamp, including a cable, a winding drum and a motor, a brake to hold the clamp released, electromagnetic means for applying the brake, and means including an electromagnetic device for controlling the circuit of the propelling motor and providing for the closure of the latter only after the brake has been applied.

68. The combination with a conveying structure, of a propelling motor, a rail clamp, a clamp-releasing motor, and means including an electromagnetic device for controlling the propelling motor circuit and providing for the closure of the latter only after the clamp has been released.

69. In a traveling bridge, the combination with a rail clamp of a motor for releasing the clamp, an electric circuit for controlling the clamp, said circuit being closed when the clamp is released, a propelling motor for the bridge, an electric circuit for the propelling motor, a switch for the propelling motor circuit, and electromagnetic means in the clamp control circuit for controlling said switch.

70. In a traveling bridge, the combination with a rail clamp of a weight for applying said clamp, means for lifting said weight, including a cable, a rope winding drum and a motor, an electric circuit for holding the clamp released, said circuit being automatically closed when the clamp is released, a propelling motor, an electric circuit for the propelling motor, a switch for the propelling motor circuit, and electromagnetic means in the clamp holding circuit for closing said switch when the clamp holding circuit is closed.

71. In a traveling bridge, the combination with a plurality of separately situated weight applied rail clamps, cables connected to lift the weights and release the clamps, a rope winding drum for simultaneously winding in said cables and releasing all of said clamps, a motor for driving said drum, a propelling motor, and means to prevent operation of the propelling motor until all of said clamps are released.

72. A traveling bridge having a rail clamp, a motor to release the clamp, a propelling motor, a controller for the propelling motor, a clamp controlling circuit, the breaking of which acts to apply the clamp, and provision to prevent the breaking of the clamp controlling circuit prior to the breaking of the propelling motor circuit.

73. In a traveling bridge, the combination with a rail clamp, of a motor to release the clamp, a propelling motor, a controller for the propelling motor, a clamp controlling circuit, and provision to prevent the control of the clamp controlling circuit to release the weight to apply the clamp prior to the breaking of the propelling circuit at the controller.

74. A traveling bridge having a rail clamp, a motor to control the clamp, a propelling motor, electric circuits for said motors, and a common controller for controlling in predetermined order the several motor circuits.

75. A traveling bridge having a rail clamp, a weight for applying said clamp, a motor for releasing the clamp, a propelling motor, electric circuits for said motors and to hold said clamp released, and a common controller for controlling in predetermined order said several circuits.

76. In a traveling bridge, the combination with a plurality of separately situated rail clamps, of controlling means therefor including a weight, a drum, a cable connecting said weight and drum, a motor for rotating the drum to take up the cable and release the clamp, a band brake for the drum, and electromagnetic means for applying the brake after the cable has been wound on the drum sufficiently to release the clamp.

77. The combination with a conveying structure, of a motor for causing the same to travel along a rail, means to clamp said structure to said rail, means including a motor for releasing said clamp, and a common controller for controlling said motors.

78. A traveling bridge having a rail clamp, a motor to release the clamp, a propelling motor, a controller for the propelling motor, means to apply energy to the clamp-releasing motor, the stoppage of which supply serves to apply the clamp, and provision for preventing the stoppage of the clamp-controlling energy prior to the breaking of the propelling motor circuit.

In testimony whereof, I have signed my name to this specification.

ALMON E. NORRIS